United States Patent
Builta et al.

(10) Patent No.: US 8,014,909 B2
(45) Date of Patent: Sep. 6, 2011

(54) CONTROL SYSTEM FOR VEHICLES

(75) Inventors: Kenneth E. Builta, Euless, TX (US); James E. Harris, Dalworthington Gardens, TX (US); Bryan P. Honza, Grapevine, TX (US); Jeffrey W. Epp, Bedford, TX (US); Kynn J. Schulte, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 945 days.

(21) Appl. No.: 10/575,223

(22) PCT Filed: Mar. 25, 2004

(86) PCT No.: PCT/US2004/009080
§ 371 (c)(1),
(2), (4) Date: Nov. 21, 2007

(87) PCT Pub. No.: WO2005/103939
PCT Pub. Date: Nov. 3, 2005

(65) Prior Publication Data
US 2007/0021878 A1    Jan. 25, 2007

(51) Int. Cl.
*G06F 17/00* (2006.01)
*B64C 13/00* (2006.01)

(52) U.S. Cl. ............. 701/7; 701/2; 701/121; 701/300; 340/989

(58) Field of Classification Search ............... None
See application file for complete search history.

(56) References Cited

U.S. PATENT DOCUMENTS

| | | | | |
|---|---|---|---|---|
| 5,043,903 A * | 8/1991 | Constant | | 701/300 |
| 5,904,724 A * | 5/1999 | Margolin | | 701/120 |
| 6,483,454 B1 * | 11/2002 | Torre et al. | | 342/30 |
| 6,526,346 B2 | 2/2003 | Ishizu | | |
| 7,286,913 B2 * | 10/2007 | Bodin et al. | | 701/11 |
| 2005/0165516 A1 * | 7/2005 | Haissig et al. | | 701/4 |

* cited by examiner

*Primary Examiner* — Michael J. Zanelli
(74) *Attorney, Agent, or Firm* — James E. Walton; Richard G. Eldredge (57) ABSTRACT

A system for controlling flight of an aircraft has sensors (37, 43), a receiver (45), and a digital control system (57), all of which are carried aboard the aircraft. The sensors (37, 43) determine the position of the aircraft relative to the earth and the inertial movement of the aircraft. The receiver (45) receives transmitted data (51, 55) communicating the position and movement of a reference vehicle relative to the earth. The control system (57) calculates the position and velocity of the aircraft relative to the reference vehicle using the data from the sensors (37, 43) and the receiver (45) and then commands flight control devices (33) on the aircraft for maneuvering the aircraft in a manner that maintains a selected position and/or velocity relative to the reference vehicle. The system allows use of a graphical or tactile user interfaces.

24 Claims, 5 Drawing Sheets

CONTROL SYSTEM FOR VEHICLES

TECHNICAL FIELD

The present invention relates in general to the field of control systems for vehicles. In particular, the present invention relates to a control system for causing a vehicle to have a selected position or selected velocity relative to a reference vehicle.

DESCRIPTION OF THE PRIOR ART

Remote control of an aircraft is typically done by commanding the airspeed or inertial speed (groundspeed) of the vehicle, and the direction of the velocity is selected by controlling the heading of the vehicle. The control inputs are usually commands given in terms of the longitudinal, lateral, or directional axis of the aircraft. Therefore, if an operator controlling the aircraft wants the aircraft to move in a certain direction, the operator must know in which direction the aircraft is pointing to determine which axis of control must be used, and in which direction, in order to make the aircraft move in the desired direction. When controlling the aircraft relative to another moving vehicle, the operator must also know the velocity and direction of the moving vehicle.

Several methods of controlling vehicles relative to another vehicle have been used, including using sensors on the controlled vehicle to determine the proximity or position of the reference vehicle. This method has been used in, for example, automotive cruise-control systems, such as those disclosed in U.S. Pub. Nos. US 2002/0072843 and US 2003/0004633. In U.S. Pat. No. 5,768,131, a radar system carried on the controlled vehicle is used to measure the distance and speed relative to vehicles in front of the controlled vehicle. Other systems have included cameras, such as U.S. Pat. No. 6,324,295 to Valery, et al., or a light source and reflector, such as U.S. Pat. No. 5,530,650 to Biferno, et al., used for determining relative positions and motions of aircraft during refueling.

Although there have been significant developments over the years in the area of remote control of aircraft and other vehicles, considerable shortcomings remain. If an operator wants to operate a controlled vehicle relative to a moving object, such as another vehicle, the operator must consider the position and velocity of both the controlled vehicle and the object, making controlling the controlled vehicle a more difficult task.

SUMMARY OF THE INVENTION

There is a need for an improved control system for vehicles.

Therefore, it is an object of the present invention to provide an improved control system for vehicles.

This object is achieved by providing a system allowing easy control of the position and velocity of a controlled vehicle relative to a reference vehicle or object. A sensor system disposed on the controlled vehicle senses the position of the controlled vehicle and inertial movement of the controlled vehicle, and a receiver disposed on the controlled vehicle receives transmitted data communicating the position and movement of a reference vehicle. The sensor system communicates data representing the position and the inertial movement of the controlled vehicle to a control system disposed on the controlled vehicle for comparison to the data from the receiver, allowing calculation of the position and motion of the controlled vehicle relative to the reference vehicle. Data representing a selected position and/or velocity of the controlled vehicle relative to the reference vehicle is compared to the calculated relative position and relative velocity, and the control system commands devices on the controlled vehicle to maneuver the controlled vehicle so as to eliminate the error between the calculated and selected values.

For example, the present invention allows control of an aircraft relative to the speed and direction of the reference vehicle. This control is independent of the wind or other motions of the reference vehicle, i.e., motion of a ship at sea that is caused by waves. Also, the velocity and position commands are independent of the attitude or heading of the aircraft or the reference vehicle. In the case of an aircraft approaching a moving ship on which it is to land, the commands can be in the X, Y, Z coordinate system relative to the ship. Thus, a command in the X-direction will move the vehicle in the bow/stem direction and a command in the Y-direction will move the vehicle in the port/starboard direction. A command in the Z-direction will change the vertical position and/or velocity relative to the moving ship.

The aircraft carries sensors for determining the position relative to the earth and inertial movements of the aircraft and carries a receiver for receiving data signals transmitted to the aircraft. The reference vehicle also carries sensors that determine the position and velocity of the reference vehicle relative to the earth. The position and velocity of the reference vehicle are transmitted to the aircraft, and a digital system carried on the aircraft calculates the position and velocity of the aircraft relative to the reference vehicle. These relative values are compared to a selected position and/or velocity, which can be communicated to the digital system by the operator prior to or during flight, and the digital system commands flight control devices on the aircraft to maneuver the aircraft to attain and maintain the selected position and/or velocity.

The velocity and position of the aircraft can be controlled by a Ground Control Station (GCS) operator by selecting the three-dimensional velocity or position commands relative to the reference vehicle by use of graphical displays on the command console. These displays can show the position and velocity of the aircraft in relation to the reference vehicle in a variety of coordinate systems, including Cartesian and polar coordinate systems. The operator can use an input device to select and drag the command to the desired value, point and click on the command, or type in the desired command on a keyboard. In addition, relative velocity or position can also be commanded from control sticks used by an operator, or commands may be autonomous, such as automatic launch or automatic approach and landing, wave off/abort landing, station keeping, or other preprogrammed commands and maneuvers.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

The present invention provides a system for controlling a controlled vehicle in relation to a reference vehicle using relative velocities, which are determined by comparing the position and movement of the controlled vehicle with the position and movement of a known point.

For purposes of illustrating the system of the invention, the system will be described in reference to its use as a control system for an aircraft operating in conjunction with a ship at sea. The known point on the ship may be a touchdown point (TDP) for landing the aircraft. The relative velocity is zero if the aircraft is moving at the same velocity, i.e., same speed and direction, as the TDP. This invention allows precise aircraft velocity control relative to the TDP regardless of the speed of the TDP or the velocity and direction of the relative wind. A unique characteristic of this system is that the control of the aircraft velocity is independent of the aircraft heading, as the system allows an operator to be able to control the aircraft relative to a moving vehicle in a manner similar to the way that groundspeed is controlled relative to a point on the ground. As used herein, "velocity" will be understood as a vector, incorporating both a direction and a magnitude, though these may be discussed independently.

Though the system of the invention is described in use with an aircraft/ship combination, the system may be used for any combination and number of land, air, or sea vehicles or other moving objects where it is useful to control the position and velocity of a vehicle relative to a movable point or vehicle. Some examples of applications include use by a ground vehicle to control aircraft, by aircraft to control ground vehicles, by aircraft to control other aircraft, and by ground vehicles to control other ground vehicles.

Figure 1:
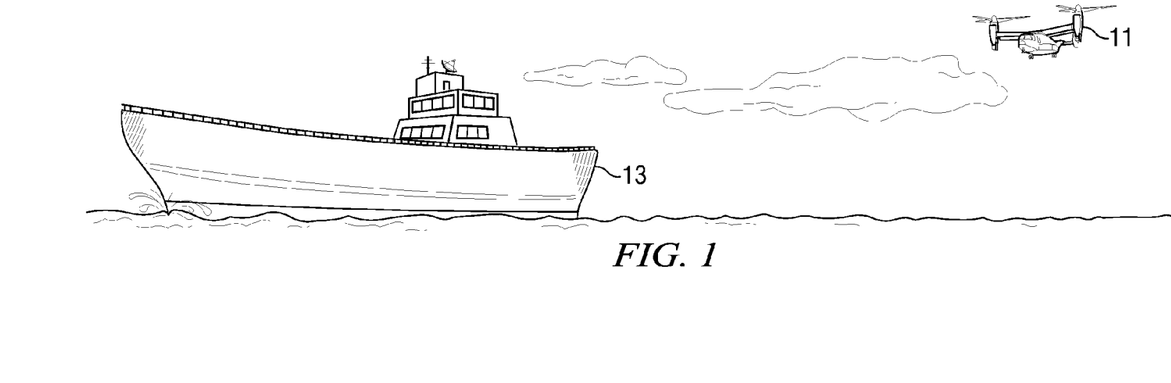
FIG. 1 is a perspective view of a ship and an aircraft that is being commanded by a flight-control system according to the present invention.
Figure 2:
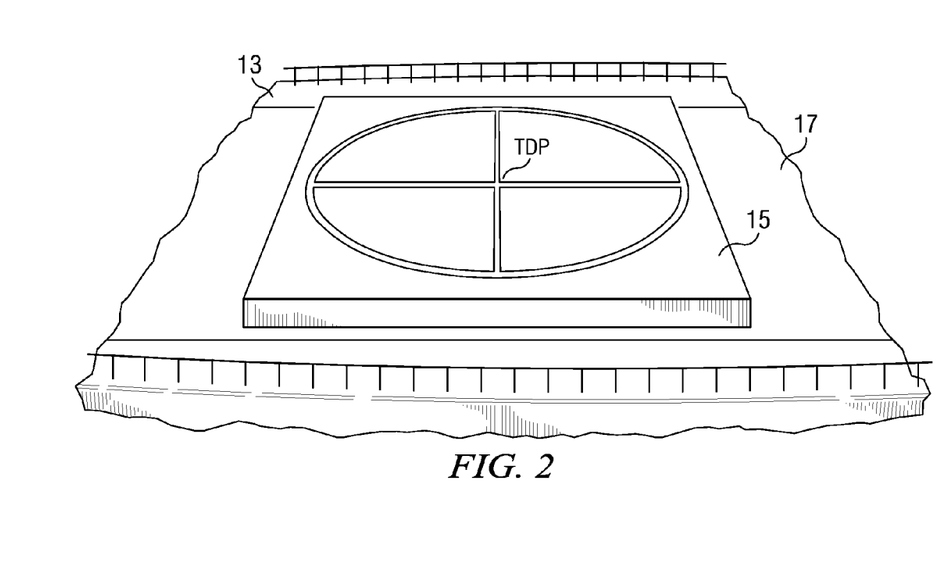
FIG. 2 is a perspective view of a landing pad located on the ship of FIG. 1.

Referring now to FIGS. 1 and 2, an aircraft 11 is depicted as flying near a ship 13. While shown in FIG. 1 as an unmanned tiltrotor-type aircraft, aircraft 11 may be of any type, and may be a fixed wing aircraft or other varieties of rotorcraft, and may be manned and controlled by a pilot. FIG. 2 shows a landing pad 15, which is located on deck 17 of ship 13 and used for launching and/or recovering aircraft 11. Though landing pad 15 is considered the TDP, the movement of landing pad is not independent of the movement of ship 13. Therefore, ship 13 is considered a "reference vehicle" for determining the position and velocity of aircraft 11 relative to ship 13, and the movement of the TDP and ship 13 may be used interchangeably.

Figure 3:
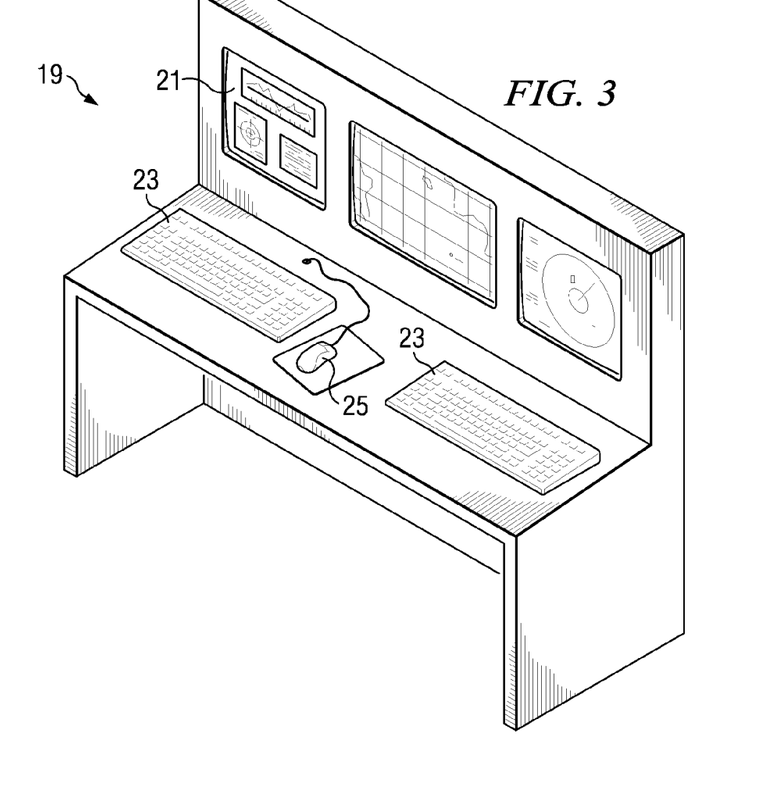
FIG. 3 is a perspective view of a ground control station of the present invention.
Figure 4:
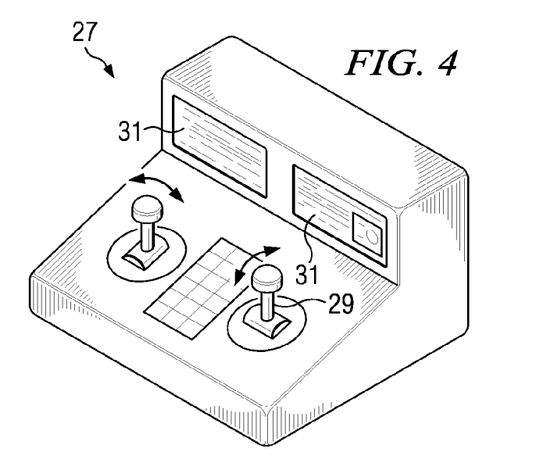
FIG. 4 is a perspective view of a flight control box of the present invention.

In order to control aircraft 11 during flight or launch/recovery, a remote piloting system is used in conjunction with a semi-autonomous controller carried on aircraft 11. Referring to FIGS. 3 and 4, the operator interface for the system may be of several types, including a ground control station (GCS) 19 having graphical and numerical displays 21, keyboards 23, mouse 25 or similar input device, and audio/video components, as shown in FIG. 3. Another example of the interface is a flight control box (FCB) 27, as shown in FIG. 4, having a set of joysticks 29 or similar tactile input devices and graphical displays 31. Aircraft 11 may be operated by one or more operators, with each operator using one of the operator interface devices. To illustrate the operation of the system of the invention, the system is described herein as comprising GCS 19 and FCB 27 for controlling aircraft 11.

The basic mode of the system allows both the operators of GCS 19 and FCB 27 to command the velocity of aircraft 11 relative to ship 13. Either of the operators can command the relative velocity from hover to the maximum airplane value, and GCS 19 can switch control back and forth from GCS 19 to FCB 27 as desired.

Figure 5:
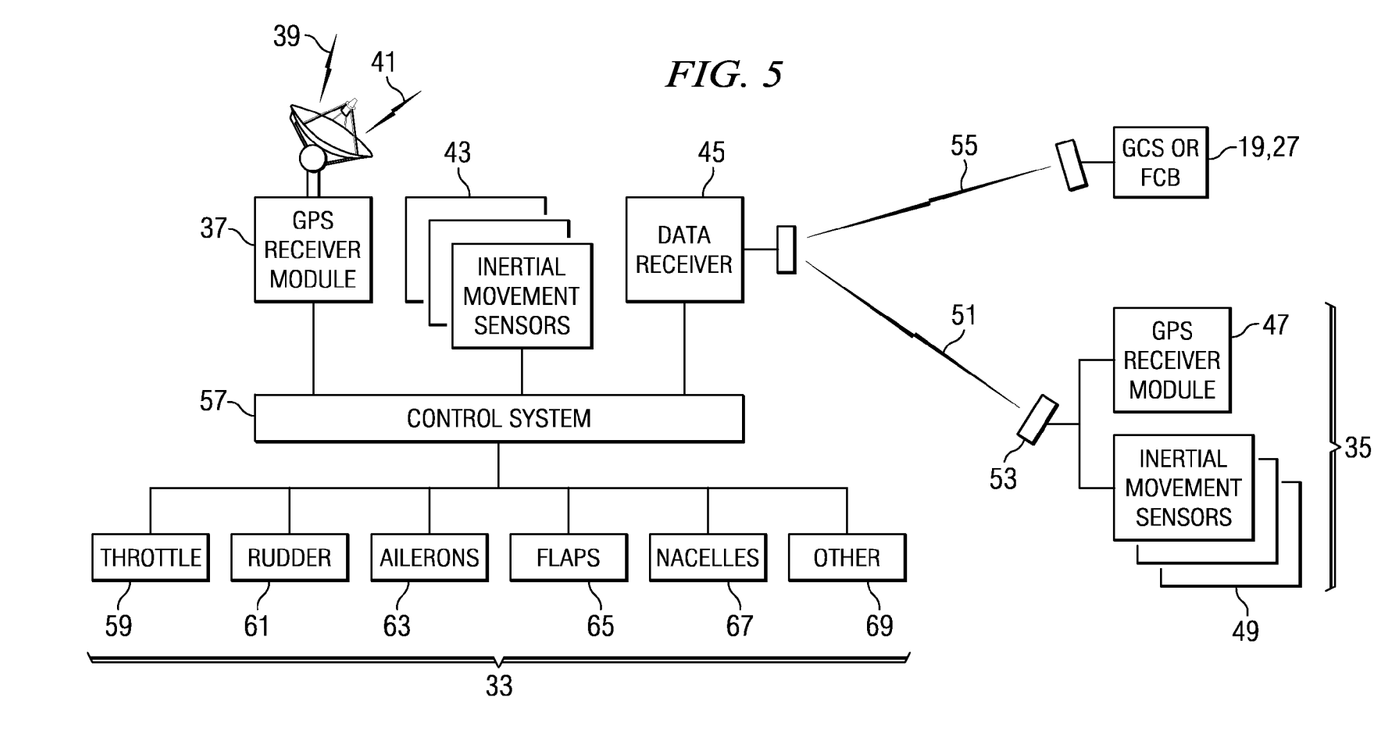
FIG. 5 is schematic view of the components of a flight control system of the present invention.

The major components of the system are shown in FIG. 5. Components carried on aircraft 11 are denoted by bracket 33, and components carried on ship, or reference vehicle, 13 are denoted by bracket 35.

On aircraft 11, a Global Positioning System (GPS) receiver module 37 receives transmitted signals 39, 41 from orbiting GPS satellites, allowing GPS module 37 to determine the position of aircraft 11 in relation to the earth. Also, inertial movement sensors 43, which may be accelerometers, measure the movement of aircraft 11 in three orthogonal axes, and a data receiver 45 receives data transmitted to aircraft 11 from components 35 on ship 13 and from GCS 19 and/or FCB 27.

On ship 13, a GPS receiver module 47 also receives GPS satellite signals (not shown) and determines the position of ship 13 relative to the earth, and inertial movement sensors 49 measure the movement of ship 13. These data sources are combined to generate position and velocity data for ship 13, and the data is then sent in a transmission signal 51 to data receiver 45 of aircraft 11 using transmitter 53.

While not required to be located on the reference vehicle, GCS 19 and FCB 27 are typically located on ship 13. GCS 19 and/or FCB 27 send a data transmission 55 to aircraft 11 for providing flight-control commands to aircraft 11. As discussed below, transmission 55 communicates the selected position and/or velocity of aircraft relative to ship 13 that the operator desires for aircraft 11 to attain and maintain until a new command is given. In some embodiments, transmissions 51 and 55 may be sent using the same transmitter, for example, transmitter 53. In addition, in those embodiments in which aircraft 11 is a manned aircraft, the pilot may transmit or otherwise input this transmitted data.

Data receiver 45 of aircraft 11 receives transmissions 51 and 55, and the transmitted data is routed to a digital control system 57 carried on aircraft 11. Additionally, the sensed data from GPS module 37 and sensors 43 are routed to control system 57, and control system 57 calculates the position and velocity of aircraft 11 in relation to the earth, as well as the position and velocity of aircraft 11 relative to the reference vehicle, which is ship 13. This calculated relative position and relative velocity is compared with the selected position and/or selected velocity communicated in transmission 55, and an amount of error is determined. Control system 57 then commands various flight-control devices on aircraft 11, such as throttle 59 and rudder 61, to maneuver aircraft so as to minimize, and preferably eliminate, the error between the calculated and selected values. Other flight control devices commanded by control system 57 may include, as shown, ailerons 63, flaps 65, engine nacelles 67, or other flight control devices 69, including cyclic controls for rotors and blade angle actuators for propellers.

A key advantage of the present invention is that aircraft 11 is controlled relative to the reference vehicle and can be commanded to move in the direction that the controls of GCS 19 or FCB 27 are moved. The response is independent of the azimuth orientation of aircraft 11. For example, if the operator wants the aircraft to move in the +X direction relative to the reference vehicle, then he will enter the desired system mode and move the X controller, such as one of joysticks 29 on FCB 27 (FIG. 4) or a graphical icon on a display of GCS 19 (FIG. 3), in the +X direction, and the commanded variable (position or velocity) relative to ship 13 will be changed in the X direction. This also applies to Y and Z directions.

Figure 6:
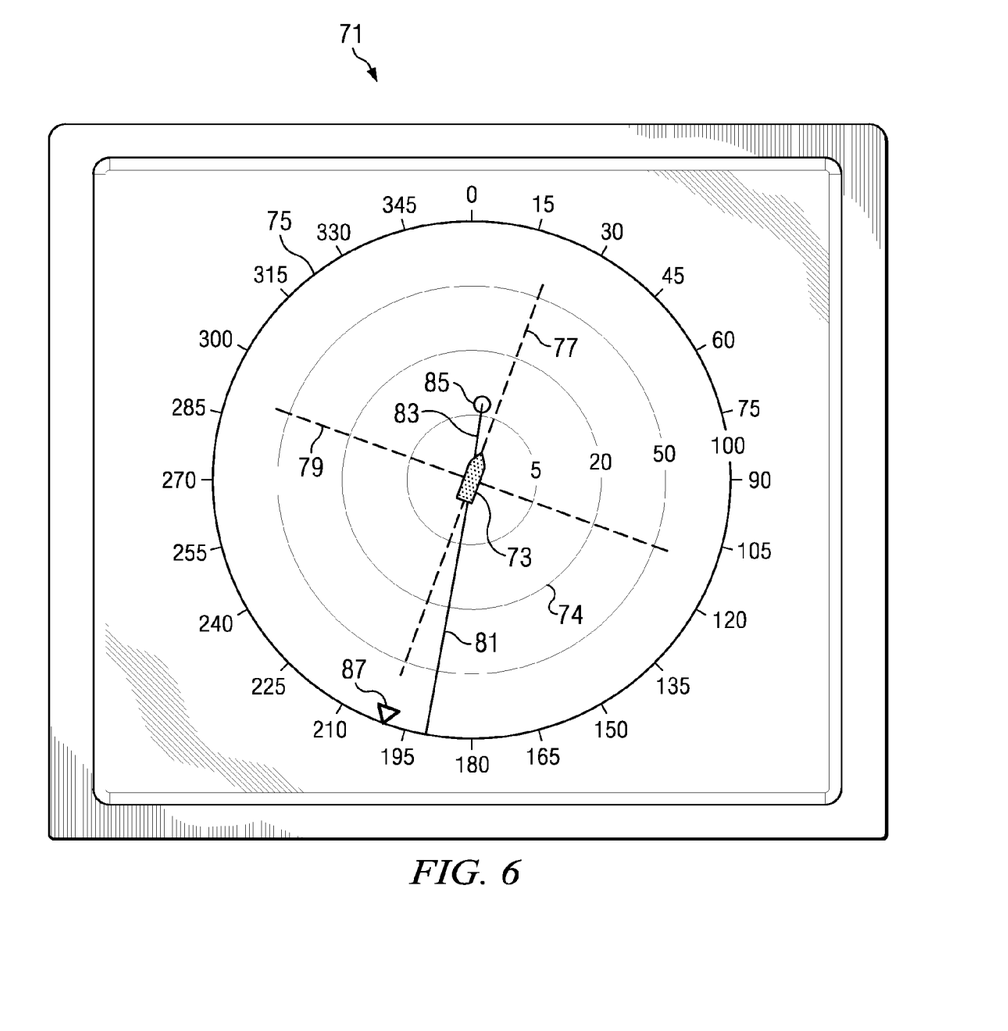
FIG. 6 is a view of a first graphical display on the ground control station of FIG. 3.
Figure 7:
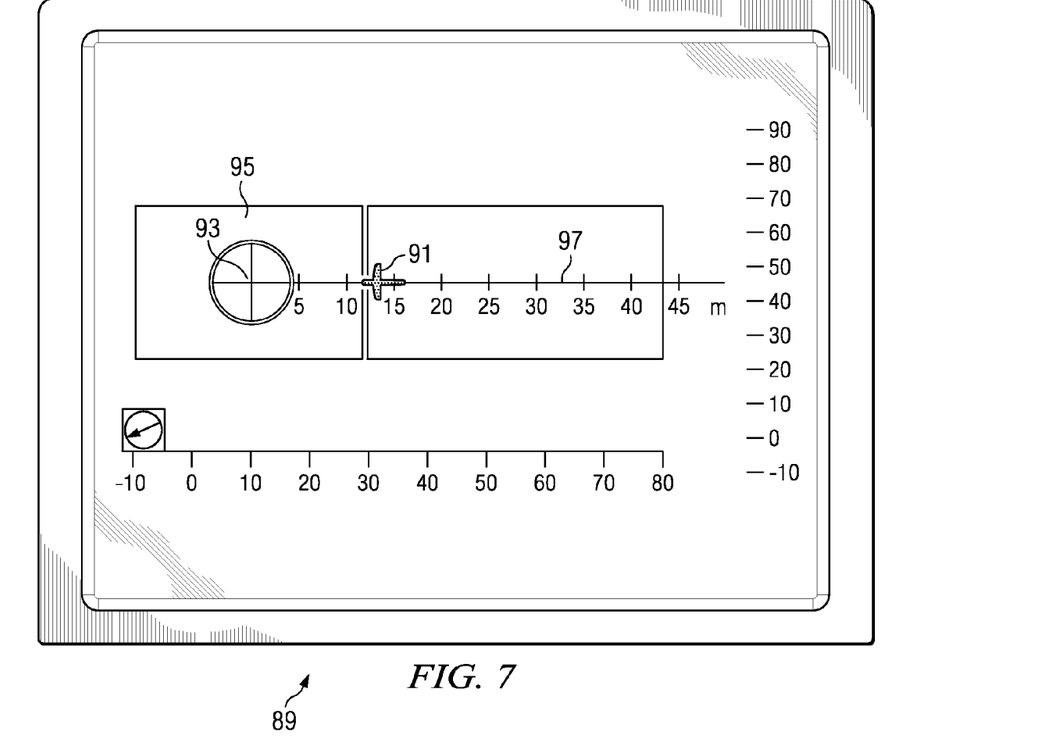
FIG. 7 is a view of a second graphical display on the ground control station of FIG. 3.

FIGS. 6 and 7 illustrate two coordinate systems that can be used when controlling aircraft 11. FIG. 6 shows a polar-coordinate, plan-view graphical display 71 that may be used by GCS 19 to send relative velocity commands to aircraft 11. Display 71 includes a reference vehicle icon 73, which represents ship 13, in the center of concentric circles 74. The heading of ship 13 relative to due north is indicated by the rotation of icon 73 in relation to a 360-degree compass 75 depicted on concentric circles 74. A Cartesian coordinate system relative to ship 13 is depicted as axes 77 and 79, wherein axis 77 is aligned with the current heading of ship 13 and icon 73, and axis 79 is perpendicular to axis 77. A line 81 points to the actual current location of aircraft 11 relative to ship 13. As shown in the example of FIG. 6, line 81 indicates that aircraft 11 is actually located a distance behind and slightly to the right of ship 13.

A vector 83 indicates the aircraft velocity (both magnitude and direction) relative to the velocity of ship 13. A small circle 85 indicates the desired terminus of the velocity commanded by GCS 19. Circle 85 will be centered at the outer end of vector 83 when the actual velocity of aircraft 11 relative to ship 13 is equal to the desired velocity of aircraft 11 relative to ship 13. Concentric circles 74 of display 71 indicate selected values of the magnitude of relative velocity. This magnitude increases as the velocity vector extends farther from the center of display 71. Because display 71 represents a polar-coordinate command system, the magnitude of the relative velocity will not be negative. This configuration allows the heading of ship 13, the commanded relative velocity of aircraft 11, and the actual relative velocity of aircraft 11 to be quickly and easily ascertained by simply viewing display 71. Should a GCS operator want to change the velocity of aircraft 11 relative to ship 13, he simply clicks on circle 85 and drags circle 85 to the location on display 71 that represents the new relative velocity. This commanded, or selected, relative velocity is then transmitted to aircraft 11, which is commanded by control system 57 (FIG. 5) to make the necessary flight control adjustments to attain and maintain the commanded relative velocity. By commanding aircraft 11 to attain a relative velocity of zero, aircraft 11 will hold its position relative to ship 13.

It should be appreciated that the system for manipulating icons on display 71 may include semi-automated actions, or shortcuts, that are programmed into the system. For example, the system may have a shortcut that allows the operator to command aircraft 11 to have zero relative velocity by right-clicking with a mouse or other input device at selected locations within display 71.

The advantages provided by command display 71 when controlling the relative velocity of aircraft 11 are that the operator can command the relative velocity vector with one simple action, and he can also see the velocity of aircraft 11 relative to this velocity command. With one small display, the operator can have situational awareness and command control, plus observe all of the following information: (1) the ship heading direction relative to the compass; (2) the direction of the aircraft position relative to the ship; (3) the direction of the aircraft velocity relative to the ship; (4) the magnitude of the aircraft velocity relative to the ship; (5) the magnitude of the commanded velocity relative to the ship; and (6) the direction of the commanded velocity relative to the ship.

Though described above as used for controlling velocity, polar-coordinate display 71 may alternatively be configured to allow positioning of aircraft 11 relative to ship 13, though this is preferably used only when aircraft 11 is located far from ship 13. During such use, an icon (not shown) representing the position of aircraft 11 can be dragged to the desired location on display 71 relative to ship 13, and aircraft 11 may have a zero relative velocity, i.e., station-keeping, or a selected relative velocity to resume from the commanded position. When used for position commands, concentric circles 74 on display 71 act as range, or radius, indicators. Shown in FIG. 6 is a triangular icon 87 that indicates a preprogrammed station point that is set up to be relative to ship 13, shown here as being a distance directly behind ship 13.

A Cartesian-coordinate, plan-view display 89 on GCS 19 is shown in FIG. 7. The Cartesian coordinates are preferably used only when aircraft 11 is near to ship 13. An icon 91 represents aircraft 11 on approach to a representation of TDP 93 on deck 95 of ship 13. The coordinates are in the X, Y system, with a range guide 97 indicating distance from TDP 93. Display 89 may be configured to allow the operator of GCS 19 to manipulate icon 91 for controlling the movement of aircraft 11 by dragging icon 91 relative to ship 13, as represented by deck 95. Alternatively, display 89 may be configured as an information-only display, which does not allow direct control of aircraft 11 by manipulating icon 91.

The operator of FCB 27 can also command aircraft 11 in either the polar or Cartesian coordinates after control has been transferred from GCS 19 to the FCB 27. When control is switched to the FCB, the joysticks 29 will be in the centered position, which will command the relative velocity to remain at its present value. This means that aircraft 11 will continue with the same velocity relative to ship 13, and in the same direction until the FCB operator commands a relative velocity change. The FCB operator can command an increase or decrease in velocity by moving a longitudinal joystick forward or rearward, respectively, and the velocity command will change proportional to stick displacement. When in polar mode, the direction of the velocity can be changed by moving a lateral joystick on FCB 27, such that left and right lateral stick motion will command the velocity vector to rotate in the counterclockwise and clockwise directions respectively, at a rate proportional to stick displacement.

The operator of FCB 27 also has the capability to fly the aircraft by commanding velocity in the ship coordinate system, which is an X, Y system. This mode is required for manually positioning the aircraft over the deck, or TDP, of the moving ship, or performing manual landings. The forward and rearward movement of the longitudinal joystick will command velocity in the X direction (fore and aft on the ship deck), and the right or left movement of the lateral joystick will command a velocity in the Y direction (port and starboard on the ship deck). The forward motion on the controller will preferably command a velocity toward the rear of the deck, and a right motion will preferably command a velocity toward the port side of the deck. When the joysticks are centered, aircraft 11 will be commanded to hold its present position relative to the TDP. These conventions were chosen because the operator of FCB 27 will be facing toward the rear of the deck as aircraft 11 approaches, and this convention will move aircraft 11 the same direction as the stick motions. Velocities are commanded in the X, Y coordinate system instead of in the aircraft axes in order to make the commands independent of the heading of aircraft 11.

One application that is particularly well suited for the control system of the invention is maneuvering an aircraft into an acquisition window for another control system. For example, the aircraft may be maneuvered into a window for acquisition by an auto-recovery or landing system.

Figure 8:
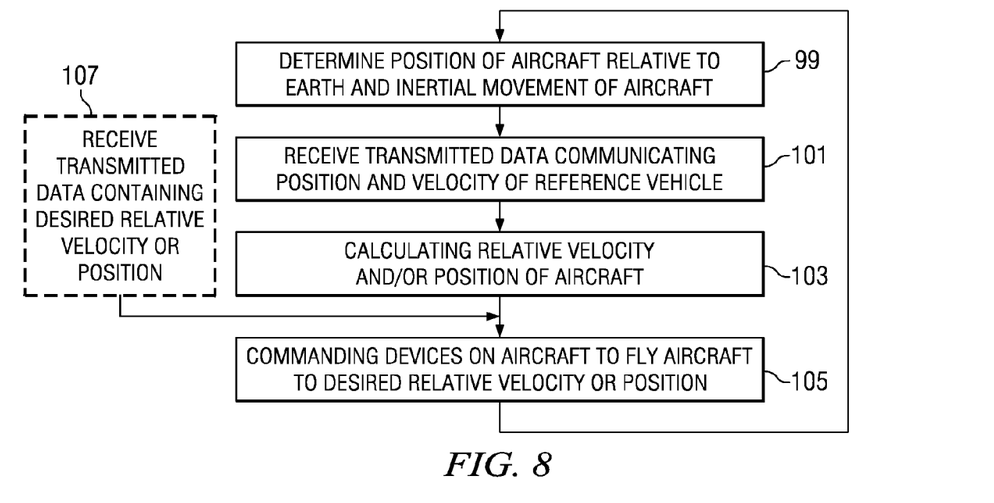
FIG. 8 is a schematic flowchart showing the steps of a method of the invention.

FIG. 8 is a flowchart illustrating the method of relative-velocity control of the system of the invention. The method begins with step 99, in which the sensor system carried on an aircraft determines the position and velocity of the aircraft relative to the earth. In step 101, the aircraft receives a data transmission communicating the position and velocity of a reference vehicle, which is used in step 103 with the sensed data from step 99 to calculate the velocity and/or position of the aircraft relative to the reference vehicle. Flight-control devices are commanded in step 105 so as to fly the aircraft to a desired relative velocity and/or position. An optional step 107 is also shown in which transmitted data communicating the desired relative velocity and/or position is received by the aircraft.

An additional advantage of the control system of the invention is that it allows for control of aircraft 11 using various autonomous and semi-autonomous modes, including:

1. Auto-recovery: In this mode, the operator maneuvers aircraft 11 into an acquisition window, then commands the auto-recovery system to land aircraft 11 on the TDP. An X,Y,Z coordinate system is defined with the positive X axis out the stem of the ship, with the option of rotation to a specified approach angle. Y is positive out the starboard side, and Z is positive in the up direction. Once acquired, the sensors on ship 13 track aircraft 11, and three-dimensional position data are sent to GCS 19, which in turn transmits these positions to aircraft 11.

2. Auto-approach: The approach phase commands the aircraft to follow a preset approach profile from its present location to a point over the TDP. The approach profile specifies a velocity in the X direction and Z position (height) as functions of distance from the TDP. The approach profile requires the aircraft Y position to go to zero and hold at zero throughout the approach, meaning aircraft 11 is aligned with the desired approach angle to ship 13. When the aircraft has arrived near the TDP, a position-hold function will be engaged to hold aircraft 11 in a hover over the TDP.

3. Deck Following: After the position hold is engaged, aircraft 11 can be commanded to start following the deck surge heave and sway motions, keeping aircraft 11 in a selected position relative to the TDP.

4. Descend to the Deck: Descend to the deck is the final phase of auto-recovery, in which aircraft 11 is commanded to descend at a specified rate relative to the TDP.

5. Waveoff/Abort: If the operator of the GCS 19 or FCB 27 chooses, aircraft 11 can be commanded to waveoff, and it will execute a predetermined maneuver to move away from ship 13. Aircraft 11 moves in the positive X direction (to the rear of ship 13) and enters a gentle vertical climb for a predetermined period of time after which the relative velocity vector is commanded to zero and the aircraft altitude is held at its then present value.

An abort is automatically entered if failure management logic of the control system determines that the auto-recovery cannot be completed. The reasons for abort may include excessive position or velocity errors, failures or loss of parts of the control system, and loss of data uplink. The control of aircraft 11 during an abort is preferably the same as for a waveoff, the only difference being that an abort is initiated automatically and a waveoff is initiated by the GCS or FCB operator.

6. Fly-To-Station: The Fly-to-Station mode allows the GCS operator to specify a point at a distance and direction from ship 13 to which aircraft 11 will fly automatically. Aircraft 11 accelerates to a prescheduled velocity profile, flies to the designated location, decelerates and stops at that location. It then holds relative position there until commanded to do otherwise. This mode is a convenient way of commanding the aircraft to fly to the acquisition window, from which the aircraft is acquired, and the auto-recovery is initiated. This type of mode may also be used automatically to send aircraft 11 to a predetermined location and fight path if data communication is lost.

The present invention provides significant advantages over the prior art, including: (1) the autonomous control of aircraft that commands the aircraft to attain and maintain the selected position and/or velocity of the aircraft relative to the reference vehicle by comparing values from onboard sensors with data transmitted to the aircraft indicating the velocity and position of the reference vehicle; (2) the easy control of aircraft relative to a moving vehicle without the operator having to consider the position or velocity of the aircraft in relation to the earth; (3) the control of the velocity of the aircraft relative to the reference vehicle by manipulating a representation of the terminus of the relative velocity vector on a graphical display to a desired angle and magnitude relative to the velocity of the reference vehicle; (4) the control of the position and/or velocity of the aircraft relative to the reference vehicle by manipulating tactile input devices, such as joysticks.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A system for controlling flight of an aircraft comprising:
    a sensor system disposed on the aircraft for sensing a position of the aircraft and an inertial movement of the aircraft, the sensor system being adapted to communicate sensed data representing the position and the inertial movement of the aircraft;
    a receiver disposed on the aircraft and adapted to receive transmitted reference data communicating a position and movement of a reference vehicle;
    commanded data representing a selected velocity of the aircraft relative to the reference vehicle; and
    a control system disposed on the aircraft for calculating a calculated velocity of the aircraft relative to the reference vehicle using the sensed data and the reference data and for controlling flight-control devices on the aircraft, such that the aircraft attains and maintains a selected velocity relative to the reference vehicle corresponding to the commanded data;
    wherein the commanded data is preprogrammed into the control system prior to flight of the aircraft.

2. A system for controlling flight of an aircraft comprising:
    a sensor system disposed on the aircraft for sensing a position of the aircraft and an inertial movement of the aircraft, the sensor system being adapted to communicate sensed data representing the position and the inertial movement of the aircraft;
    a receiver disposed on the aircraft and adapted to receive transmitted reference data communicating a position and movement of a reference vehicle;
    commanded data representing a selected velocity of the aircraft relative to the reference vehicle; and
    a control system disposed on the aircraft for calculating a calculated velocity of the aircraft relative to the reference vehicle using the sensed data and the reference data and for controlling flight-control devices on the aircraft, such that the aircraft attains and maintains a selected velocity relative to the reference vehicle corresponding to the commanded data;

wherein the receiver is further adapted to receive a transmission communicating the commanded data; and     wherein the commanded data is generated using a control station remote to the aircraft by manipulating a graphical user interface.

3. The system according to claim 2, wherein the commanded data is transmitted from the reference vehicle.

4. A system for controlling flight of an aircraft comprising:
a sensor system disposed on the aircraft for sensing a position of the aircraft and an inertial movement of the aircraft, the sensor system being adapted to communicate sensed data representing the position and the inertial movement of the aircraft;
a receiver disposed on the aircraft and adapted to receive transmitted reference data communicating a position and movement of a reference vehicle;
commanded data representing a selected velocity of the aircraft relative to the reference vehicle; and
a control system disposed on the aircraft for calculating a calculated velocity of the aircraft relative to the reference vehicle using the sensed data and the reference data and for controlling flight-control devices on the aircraft, such that the aircraft attains and maintains a selected velocity relative to the reference vehicle corresponding to the commanded data;
    wherein the receiver is further adapted to receive a transmission communicating the commanded data; and
    wherein the commanded data is generated using a control station remote to the aircraft by manipulating a tactile user interface.

5. The system according to claim 4, wherein the transmitted data communicating the position and movement of the reference vehicle are transmitted from the reference vehicle.

6. The system according to claim 4, wherein the sensor system determines the position of the aircraft using a Global Positioning System receiver module.

7. A system for controlling the flight of an aircraft comprising:
sensors carried on the aircraft, the sensors being adapted to determine the position of the aircraft relative to the earth and the inertial movement of the aircraft, the sensors also being adapted to output data communicating the position and movement of the aircraft;
a receiver carried on the aircraft and adapted to receive transmitted data communicating the position of a reference vehicle relative to the earth and movement of the reference vehicle relative to the earth; and
a control system carried on the aircraft and connected to the sensors and the receiver, the control system calculating the position of the aircraft relative to the reference vehicle and movement of the aircraft relative to the reference vehicle using the data from the sensors and the data received by the receiver, the control system being adapted to command flight-control devices on the aircraft for causing the aircraft to maneuver in a manner that attains and maintains a selected position relative to the reference vehicle or a selected velocity relative to the reference vehicle;
    wherein the selected position and velocity of the aircraft relative to the reference vehicle is selected and input into the control system prior to flight of the aircraft.

8. The system according to claim 7, wherein the receiver is adapted to receive data communicating the selected position and velocity of the aircraft relative to the reference vehicle.

9. The system according to claim 8, wherein the data communicating the selected position and velocity of the aircraft relative to the reference vehicle is transmitted from the reference vehicle.

10. The system according to claim 7, wherein the data communicating the position and movement of the reference vehicle is transmitted from the reference vehicle.

11. The system according to claim 7, wherein the sensors determine the position of the aircraft using a Global Positioning System receiver module.

12. A multi-vehicle system comprising:
a reference vehicle;
at least one aircraft;
a reference sensor system carried on the reference vehicle and adapted to determine the position relative to the earth and the movement relative to the earth of the reference vehicle;
an aircraft sensor system carried on each aircraft and adapted to determine the position relative to the earth and the inertial movement of each corresponding aircraft;
a receiver carried on each aircraft for receiving transmitted data communicating the position and movement of the reference vehicle; and
a control system carried on each aircraft adapted to calculate the velocity of each corresponding aircraft relative to the reference vehicle and adapted to command flight-control devices for causing each corresponding aircraft to fly at a selected velocity relative to the reference vehicle;
    wherein the reference vehicle is a ship.

13. A multi-vehicle system comprising:
a reference vehicle;
at least one aircraft;
a reference sensor system carried on the reference vehicle and adapted to determine the position relative to the earth and the movement relative to the earth of the reference vehicle;
an aircraft sensor system carried on each aircraft and adapted to determine the position relative to the earth and the inertial movement of each corresponding aircraft;
a receiver carried on each aircraft for receiving transmitted data communicating the position and movement of the reference vehicle; and
a control system carried on each aircraft adapted to calculate the velocity of each corresponding aircraft relative to the reference vehicle and adapted to command flight-control devices for causing each corresponding aircraft to fly at a selected velocity relative to the reference vehicle;
    wherein the reference vehicle is a land-based vehicle.

14. A flight control system for controlling the velocity of an aircraft relative to a reference vehicle comprising:
a control station carried by the reference vehicle; and
a hand-held controller; wherein either the control station or the hand-held controller may be used to control the velocity of the aircraft relative to the reference vehicle.

15. The flight control system according to claim 14, wherein the hand-held controller includes tactile input devices.

16. A graphical display for controlling the velocity of an aircraft relative to a moving vehicle, comprising:
a moving-vehicle icon representing the moving vehicle;
a velocity-vector icon representing the actual velocity of the aircraft relative to the moving vehicle;
a commanded-relative-velocity icon representing a selected velocity of the aircraft relative to the moving vehicle;

wherein the velocity of the aircraft relative to the moving vehicle may be selectively controlled by moving the commanded-relative-velocity icon within the graphical display.

17. The graphical display according to claim 16, wherein the graphical display is programmed to generate signals for controlling the aircraft in response to the movements of the commanded-relative-velocity icon.

18. The graphical display according to claim 16, further comprising:
a relative-velocity-magnitude icon representing the velocity of the aircraft relative to the moving vehicle.

19. The graphical display according to claim 18, wherein the relative-velocity-magnitude icon is a plurality of circles concentric about the moving-vehicle icon.

20. The graphical display according to claim 16, wherein the velocity-vector icon changes in response to the movements of the commanded-relative-velocity icon, so as to represent the aircraft attaining and maintaining the selected velocity of the aircraft relative to the moving vehicle.

21. The graphical display according to claim 16, further comprising:
a polar coordinate system for indicating the heading of the moving vehicle.

22. The graphical display according to claim 16, further comprising:
a Cartesian coordinate system linked to the moving-vehicle icon to aid in selecting the movements of the commanded-relative-velocity icon.

23. The graphical display according to claim 16, further comprising:
an aircraft-location icon representing the current physical location of the aircraft relative to the moving vehicle.

24. The graphical display according to claim 16, further comprising:
a station-keeping icon representing a preprogrammed position or velocity of the aircraft relative to the moving vehicle.

* * * * *